INVENTOR
HAROLD G. LEE
BY
BUCKHORN, CHEATHAM & BLORE
ATTORNEYS

Dec. 22, 1964 H. G. LEE 3,162,044

MAGNETIC DATA RECORDER

Filed Nov. 30, 1962 4 Sheets-Sheet 2

INVENTOR
HAROLD G. LEE

BY
BUCKHORN, CHEATHAM & BLORE
ATTORNEYS

Dec. 22, 1964 H. G. LEE 3,162,044

MAGNETIC DATA RECORDER

Filed Nov. 30, 1962 4 Sheets-Sheet 3

INVENTOR
HAROLD G. LEE

BY
BUCKHORN, CHEATHAM & BLORE
ATTORNEYS

MAGNETIC DATA RECORDER

Filed Nov. 30, 1962 4 Sheets-Sheet 4

INVENTOR
HAROLD G. LEE
BY
BUCKHORN, BLORE, KLARQUIST & SPARKMAN
ATTORNEYS

United States Patent Office 3,162,044
Patented Dec. 22, 1964

3,162,044
MAGNETIC DATA RECORDER

Harold G. Lee, Portland, Oreg., assignor to Leupold & Stevens Instruments, Inc., Portland, Oreg., a corporation of Oregon Filed Nov. 30, 1962, Ser. No. 241,422
9 Claims. (Cl. 73—312)

The subject matter of the present invention relates generally to recording apparatus and in particular to magnetic data recorders which convert the data into a number by the rotation of counter cylinders having a plurality of permanent magnets which are mounted in a numerical code on the outer surfaces of such cylinders. The magnetically coded number is read out by periodically scanning the permanent magnets on the counter cylinders with magnetic pick-up heads which convert such magnetic number into an electrical signal containing a series of coded pulses and recording such electrical signal on magnetic tape by transmitting the signal to a magnetic recording head.

The magnetic data recorder of the present invention is especially useful for automatically recording the level of a liquid, such as water, and is an improvement over known types of liquid level recorders frequently employed in rivers and reservoirs to constantly monitor and record the changing water level. The magnetic data recorder of the present invention has several advantages over conventional data recorders including the fact that it is of a simple and inexpensive construction which requires little maintenance for proper operation. The present magnetic recorder is portable and entirely self contained except for a timing device which determines when a reading is taken from the counter cylinders and recorded on magnetic tape. The recorder may be battery operated so that it may be used in remote locations where commercial power is not available. Another advantage of the magnetic data recorder of the present invention is that it enables a permanent recording to be made periodically on magnetic tape of the data continuously received by the data recorder by operating the tape recorder independently of a continuously operating counter in such magnetic data recorder. This periodic recording coupled with a relatively slow tape speed in the order of .3 inch per second allows the data recorder to operate for many months unattended before the magnetic tape is covered with data so that it must be replaced.

The counter has an improved structure which includes a plurality of counter cylinders having permanent magnets arranged in numerical code on their outer surfaces and supported along a circular path to indicate the amount of data received by the rotational position of such magnets. This counter structure allows a plurality of magnetic pick-up heads to be mounted for rotation on a shaft whose axis passes through the center of the circular path of such counter cylinders so that an electrical readout signal from the counter is produced merely by rotation of the pick-up heads past the magnets. In order to obtain a more accurate electrical readout of the counter, a locking mechanism is provided to prevent rotation of the counter cylinders during movement of the magnetic pick-up heads past the indicator magnets on such cylinders for permanently recording the reading on magnetic tape. This locking mechanism includes a positioning index on the driver counter cylinder which is coupled to the data source, such as the float pulley of a liquid level recorder, and stops rotation of such driver cylinder in one of ten decimal positions determined by such index member. Since the remaining counter cylinders are interconnected so that they are all rotated by the driver cylinder, the locking mechanism stops rotation of all the cylinders on a single decimal digit rather than between two such digits. The present data recorder has the additional advantage that the locking mechanism employed to prevent rotation of the counter cylinders is constructed so that such locking mechanism will not bind or jam regardless of the position where it engages the index member on the driver cylinder.

Briefly, one embodiment of the magnetic data recorder of the present invention adapted to record liquid level, includes a float body adapted to move with the level of the liquid, a plurality of counter cylinders each having a plurality of permanent magnets arranged in a binary numerical code on its outer surface, and a float pulley and gear train mechanism for rotating such cylinders in response to the movement of such float to indicate liquid level by the rotational position of such magnets. The data recorder also employs a plurality of magnetic pick-up heads rotatably mounted adjacent the outer surfaces of the counter cylinders for obtaining an electrical readout signal from the counter and transmitting such signal to a magnetic tape recorder. A lock mechanism is mounted adjacent the counter cylinders for momentarily stopping the rotation of such counter cylinders when a cam is rotated by a motor and gear train to activate such locking mechanism and to rotate the pick-up heads past the indicator magnets on the counter cylinders. The output of the pick-up heads is connected to the magnetic recording head of a conventional tape recorder whose capstan is rotated in synchronism with such pick-up heads to move the tape past the recording head only during rotation of the pick-up heads. The electric motor which rotates the pick-up heads and the tape capstan is connected through a cam actuated switch to a battery and a timing device for operating such motor. The timing device closes the switch circuit periodically to turn the motor "on" momentarily so that the pick-up heads rotate to record a counter reading and the switch cam rotates sufficiently to open the switch circuit to turn the motor "off" again.

It is therefore one object of the present invention to provide an approved magnetic data recorder.

Another object of the invention is to provide an improved magnetic data recorder having a counter which is simple and inexpensive in construction, and reliable in operation.

A further object of the present invention is to provide an improved magnetic data recorder which is portable, battery operated, and substantially entirely self-contained.

An additional object of the present invention is to provide an improved magnetic data recorder in which a plurality of counter cylinders having a plurality of permanent magnets mounted in numerically coded rows on the outer surface of such cylinders are employed for continuously monitoring the data received by such recorder, and in which a plurality of magnetic pick-up heads are employed to sweep over the outer surface of such counter cylinders in order to periodically record the reading of such counter cylinders on magnetic tape so that the magnetic data recorder can operate for extended periods of time without changing such tape.

Another object of the invention is to provide an improved liquid level recorder in which a magnetic counter mechanically connected to a float is employed along with an electrical readout device and a locking mechanism to accurately record the level of a liquid.

A still further object of the present invention is to provide an improved locking mechanism for stopping the rotation of a shaft in one of several index positions which is constructed to prevent jamming of such locking mechanism.

Other objects and advantages of the present invention will be apparent in the following detailed description of a preferred embodiment thereof and in the attached drawings of which:

Figure 1:
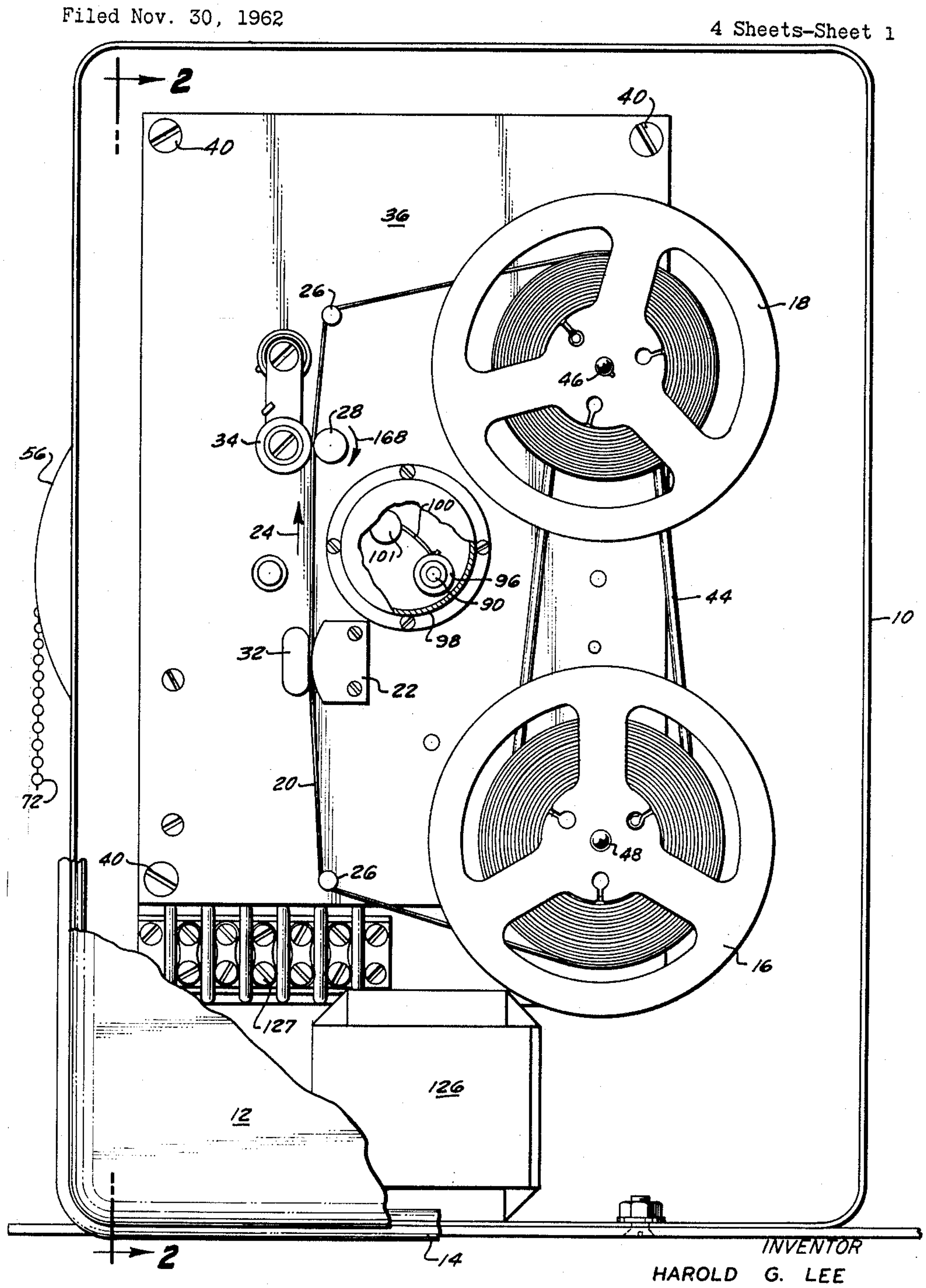
FIG. 1 is a front view of the preferred embodiment of the magnetic data recorder of the present invention.
Figure 2:
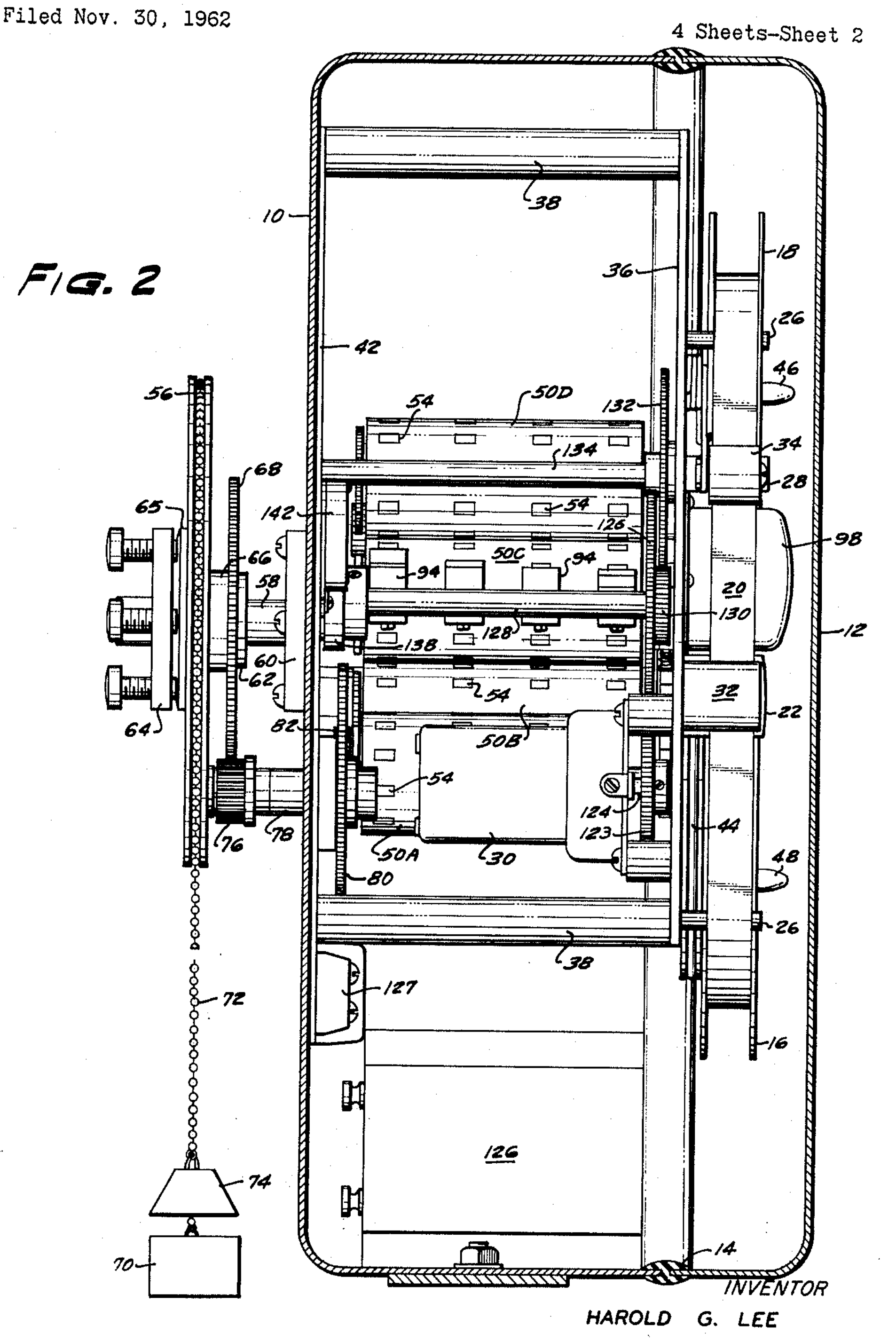
FIG. 2 is a vertical sectional view taken along the lines 2—2 of FIGURE 1.

The magnetic data recorder of the present invention is shown in FIGURES 1 and 2 to include a hollow metal housing 10 having a lid 12 which is sealed to the remainder of the housing by a rubber gasket 14 to prevent moisture and dirt from entering the housing and damaging the recorder contained therein. This data recorder includes a conventional magnetic tape recorder having a supply reel 16 and a take-up reel 18 which allow movement of a magnetic tape 20 past a magnetic recording head 22. The magnetic tape 20 is moved in a direction of arrow 24 over a pair of spaced guide pins 26 by means of a capstan 28 positioned between such guide pins which is rotated by a D.C. electric motor 30 in a manner hereafter described. As the tape is moved past the recording head 22 it is pressed into contact with the electromagnet of such recording head by a conventional pressure pad 32 in order to record on magnetic tape the electrical signal transmitted to such recording head. The capstan 28 presses the tape 20 against the resilient surface of a spring biased roller member 34 in order to provide the friction force necessary to pull the tape across the recording head 22 in a conventional manner. This tape recorder mechanism is mounted on the front surface of a metal support plate 36 inside the housing 10 and such support plate is attached to such housing by four spacer rods 38 and screws 40 at the four corners of such plate. The spacer rods 38 are attached to another support plate 42 which is suitably secured to the inner surface of housing 10 so that the support plate 36 is spaced from such housing. A coupling spring 44 is provided about suitable pulleys which are connected to the spindles 46 and 48 of the take-up and supply reels, respectively, in order to couple the rotation of the supply reel 16 to the take-up reel 18. A coil spring is employed as a coupling element 44 so that slippage can exist between the supply reel and the take-up reel when the tape is taut.

Four encoding or counter cylinders 50A, 50B, 50C and 50D of the same diameter are supported on shafts 52 which are rotatably mounted between the support plates 36 and 42, as shown in FIG. 2. Each of the counter cylinders has a plurality of permanent magnets 54 mounted endwise inside holes in the outer surface of such counter cylinder so that either the north pole or the south pole of such magnet is exposed. The permanent magnets 54 may be in the form of rectangular or circular plugs of magnetic material having an extremely strong magnetic field. When the magnetic data recorder of the present invention is used to record the level of a liquid, one of the counter cylinders is connected by a suitable gear train, such as that shown in FIGURE 3, to float pulley 56. This float pulley is supported on the housing 10 by a pulley shaft 58 and a bracket 60 which is fastened by means of screws to the housing and the support plate 42. The float pulley 56 is secured to a sleeve 62 which is mounted for rotation about the pulley shaft 58, by means of a clamp 64 which is keyed to the pulley shaft. The clamp 64 includes a clamp washer 65 which urges the pulley to the right against a spacer member 66 that pushes a gear wheel 68 against the shoulder of the sleeve 62. A suitable float body 70 adapted to float at the level of the liquid under investigation is attached to one end of a chain 72 which extends over the pulley 56 to a weight 74 attached to the other end of such chain. Thus, the float 70 moves with the level of the liquid to rotate the pulley 56 and the first gear 68 in response to changes in the level of such liquid.

Figure 3:
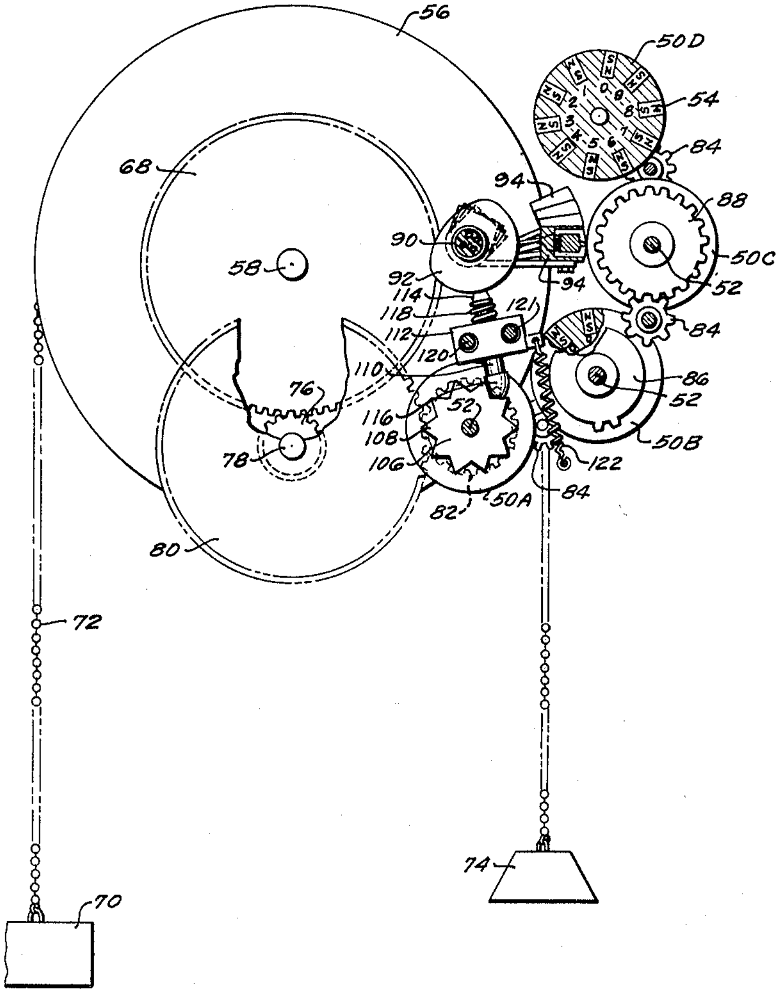
FIG. 3 is a diagrammatic view of the gear train which rotates the counter cylinders employed in the recorder of FIGURE 1.

As shown in FIGURE 3, the teeth of the first gear 68 mesh with the teeth of a smaller second gear 76 which is mounted on a gear shaft 78 extending through the side of the housing 10 from a position on the exterior of such housing adjacent the float pulley to a position inside such housing where it is connected to a third gear 80. The teeth of the third gear 80 mesh with the teeth of a smaller fourth gear 82 mounted on the shaft 52 of the driver counter cylinder 50A. Thus, the driver cylinder is rotated in response to rotation of the float pulley 56. If the gear ratios are properly chosen for the gear train 68, 76, 80 and 82, the rotational movement of the counter cylinder 50A will indicate the linear movement of the float 70 in one-hundredths of a foot. In order for the rotational position of the counter cylinder 50A to indicate in decimal numbers the movement of the float, the permanent magnets 54 are arranged in ten rows on the outer surface of such cylinder equally spaced 36° apart about the 360° circumference of the cylinder. Each one of these rows contains four magnets which are arranged with either their north or south poles exposed in a binary code. This coded arrangement of the permanent magnets 54 on each of the counter cylinders 50 allows a decimal readout from the magnetic recorder to be achieved in a manner hereafter described.

The driver cylinder 50A is connected through a transfer gear 84 to the second counter cylinder 50B which is calibrated in one-tenth of a foot. This transfer gear allows both of the counter cylinders 50A and 50B to rotate in the same direction. In a similar manner the second counter cylinder 50B is connected to a third counter cylinder 50C by another transfer gear 84 which is driven by a mutilated gear 86 attached to the shaft of the second cylinder and which drives a full year 88 attached to the shaft of the third cylinder. Each of the cylinders 50A, 50B and 50C has a mutilated gear 86 mounted on one end of its gear shaft 52 so that it engages one of the transfer gears 84. Likewise, each of the cylinders 50B, 50C and 50D has a full gear 88 attached to the other end of the shaft for engagement with one of the transfer gears. The mutilated gear 86 has only two teeth to drive the transfer gear, while the transfer gear drives twenty teeth on the full gear 88. Thus, the mutilated gear 86 must make ten revolutions to produce one revolution of the full gear 88. Therefore, it requires ten revolutions of the hundredths cylinder 50A to produce one revolution of the tenths cylinder 50B, while it takes ten revolutions of the tenths cylinder to provide one revolution of the units digit cylinder 50C and it requires ten revolutions of the units digit cylinder to provide one revolution of the tens digit cylinder 50D.

The counter cylinders 50A, 50B, 50C and 50D are spaced 45° apart along an arcuate path with their axes parallel and positioned approximately the same distance from the center of a circle drawn tangent to the outer surface of each of such cylinders. A cam shaft 90 is mounted with its axis passing through the center of such circle parallel to the axes of the counter cylinders and a lock cam 92 is secured for rotation with such cam shaft. Four magnetic pick-up heads 94 are also secured to the cam shaft 90 for rotation therewith and are positioned so that they will pass adjacent the outer surface of the counter cylinders. Each of the pick-up heads is aligned with one of the four magnets 54 forming each of the ten rows of magnets on the counter cylinders so that each pick-up head will produce an electrical signal in accordance with the polarity of the magnet. These permanent magnets are in an indicator position on the counter cylinders when they are substantially tangent to the circle formed by the recording gap of the magnetic cores employed in the pick-up heads during rotation thereof. The pick-up heads are staggered 10° apart about the axis of the cam shaft 90 to enable the use of one recording head. This allows serial recording thereby eliminating some of the problems connected with parallel recording, such as cross talk and expensive multiple heads. If the information is to be telemetered, serial transmission does not require parallel input devices at the receiver. If the information is on tape, serial recording does not require precision parallel "read" heads.

Figure 5:
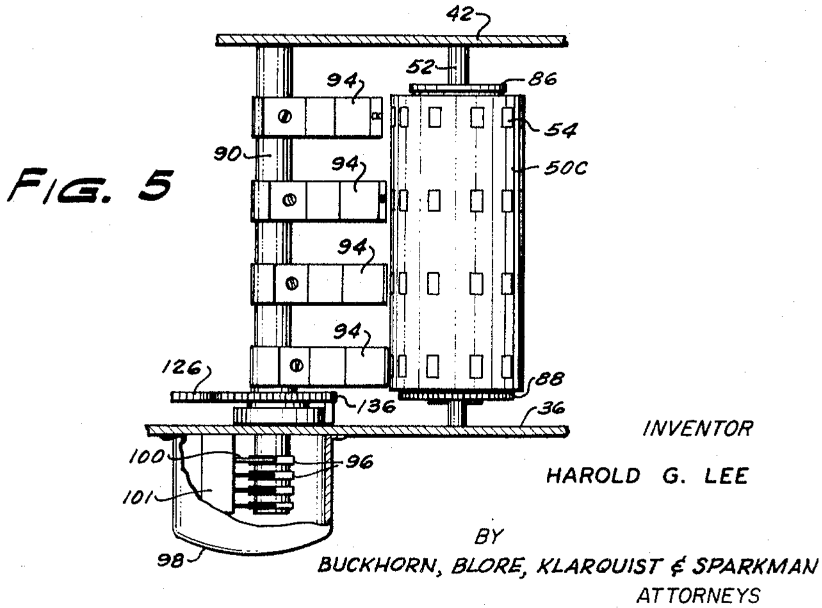
FIG. 5 is a partial horizontal sectional view taken along the line 5—5 of FIGURE 4.

The electrical signal generated in the pick-up heads 94 is transmitted through insulated lead wires up the center of the shaft 90 to one of the four slip rings 96 shown in FIGURE 5. The slip rings 96 are mounted on the end of the shaft 90 which extends above the support plate 36 inside a metal container 98 screwed to such support plate. Each of the slip rings is engaged by one of four spring contacts 100 which is supported on a support post 101 and is connected in a known manner to the recording head 22. The recording head 22 may be provided with four recording electromagnets, each connected to a different one of the four spring contacts 100, if it is desired to record four separate channels on the magnetic tape 20. However, if it is desired to use a recording head having only one recording magnet this may be accomplished by staggering the position of the pick-up heads 94 in the manner shown by a number of degrees which is less than the number of degrees between recording cylinders. Thus, the pick-up heads are separated by 10° so that the total spread from the first to the fourth pick-up head is only 30°, which is substantially less than the 45° spacing between recording cylinders. This allows the last pick-up head to finish reading out the recording cylinder 50D before the first pick-up head begins reading out on the recording cylinder 50C so that a space exists between the two groups of four magnetic dots corresponding to the tens and units digits. A tape 20 recorded in this manner is shown in FIGURE 7.

Figure 7:
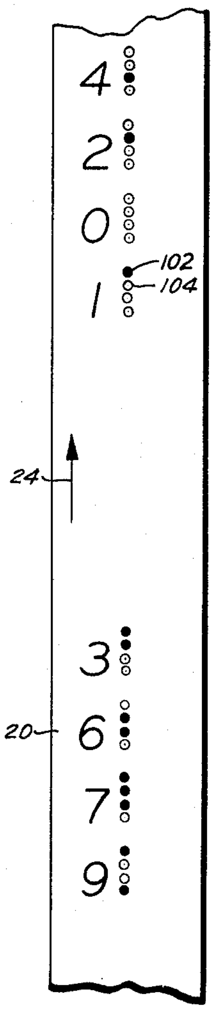
FIG. 7 is a diagrammatic view of part of a magnetic tape which has been employed in the recorder of FIGURE 1.

When only one recording magnet is employed, the electrical pulses produced by the permanent magnets 54 during readout are recorded in series on the magnetic tape 20, as shown in FIGURE 7. The shaded circles 102 on the tape represent north magnetic signals while the unshaded circles 104 represent south magnetic signals received by the pick-up heads from the permanent magnets. Since the tape 20 moves in the direction of arrow 24 the two liquid levels recorded are 42.01 feet and 36.79 feet. The first decimal number placed on the tape 20 is the tens digit 4 due to the fact that the pick-up heads pass the tens counter cylinder 50D first. Of course, if only a single recording magnet is employed in the recording head 22 and the pick-up heads 94 are staggered in the manner shown, the electrical pulses transmitted from the pick-up heads are spaced in time so that only one set of slip rings 96 and spring contacts 100 is necessary. Either system may be employed to advantage since the single magnet recording head costs less, but requires more tape footage to record the same data that is recorded by a four magnet recording head. While it is not essential, an amplifier may be connected between the pick-up heads and the recording head to amplify the electrical signal pulses before they are recorded on tape.

In order to insure that the counter cylinders 50 will be in the proper rotational position when the pick-up heads 94 are rotated past the outer surface of such cylinders to scan the magnets therein, a locking mechanism is provided for the driver cylinder 50A. This locking mechanism includes a position index member 106 which is secured to the shaft 52 of such driver cylinder. This index member has ten triangular shaped index points 108 extending radially from such member about the circumference thereof. Between each of the ten index points 108 is an index space which corresponds to one of the ten decimal positions of the counter cylinder. The locking mechanism also includes a plunger rod 110 which is supported for longitudinal movement in a guide member 112 adjacent the lock cam 92. One end of the plunger rod 110 is shaped as a cam follower 114 while the other end of such rod is provided with a bullet-shaped tapered point 116 of circular cross section. A bias spring 118 is positioned around the plunger rod 110 to urge the cam follower end 112 of such rod into engagement with the surface of cam 92. The bias spring 118 normally urges the plunger rod 110 out of engagement with the index member 106 when the pick-up heads 94 are not in the readout position shown in FIGURE 3. However, once the cam shaft 90 is rotated by the actuating mechanism shown in FIGURES 4 and 6 to the position shown, the cam surface of the lock cam 92 presses the plunger 110 downward until its tapered point 116 engages one of the index points 108 of the index member 106. This causes the driver counter cylinder 50A to stop revolving in a position corresponding to one of the decimal number positions of the permanent magnets 54 mounted thereon since the cylinder will continue to rotate until the point 116 of the plunger rod 110 lodges into one of the index spaces between the index points.

While the plunger rod 110 approaches the index member 106 in a direction which passes to the right of the axis of the shaft 52, there is a possibility that the locking mechanism could jam if the tip of the tapered point 116 initially engaged the tip of one of the index points 108. The effect of jamming or binding of the locking mechanism would be to incorrectly position the recording cylinders between two decimal positions so that each of the pick-up heads 54 would move through the effective magnet field of two magnets rather than one for each counter cylinder to produce a defective recording. In order to prevent jamming of the locking mechanism the guide member 112 is loosely mounted by oversize holes on a pair of mounting rods 120 and 121 positioned on opposite sides of the guide passage for the plunger rod 110. Also a bias spring 122 is connected at one end to one side of the guide member 112 and is anchored at its other end to the housing to resiliently urge such guide member clockwise into a position where the guide member engages the bottom of the support rod 120 and the top of the support rod 121. However, the force of the plunger rod 110 transmitted through the spring 118 during rotation of the cam 92 moves the guide member to the position shown when it initially contacts the index member 106. If the tip of the index point 108 contacts the tip of the plunger rod point 116 when the index member is rotating clockwise, no jamming results because the plunger rod point is moved away from the cylinder shaft 52 by the index point to the right against the force of bias spring 122 until the tapered point 116 moves off the index point, back to the left and into the index space locking the counter cylinder 50A into a decimal number position. Similarly, if the index member is rotating counterclockwise, the point 116 of the plunger rod moves to the left with the index point until it moves off such point and slides back to the right into the index space.

Figures 4, 6:
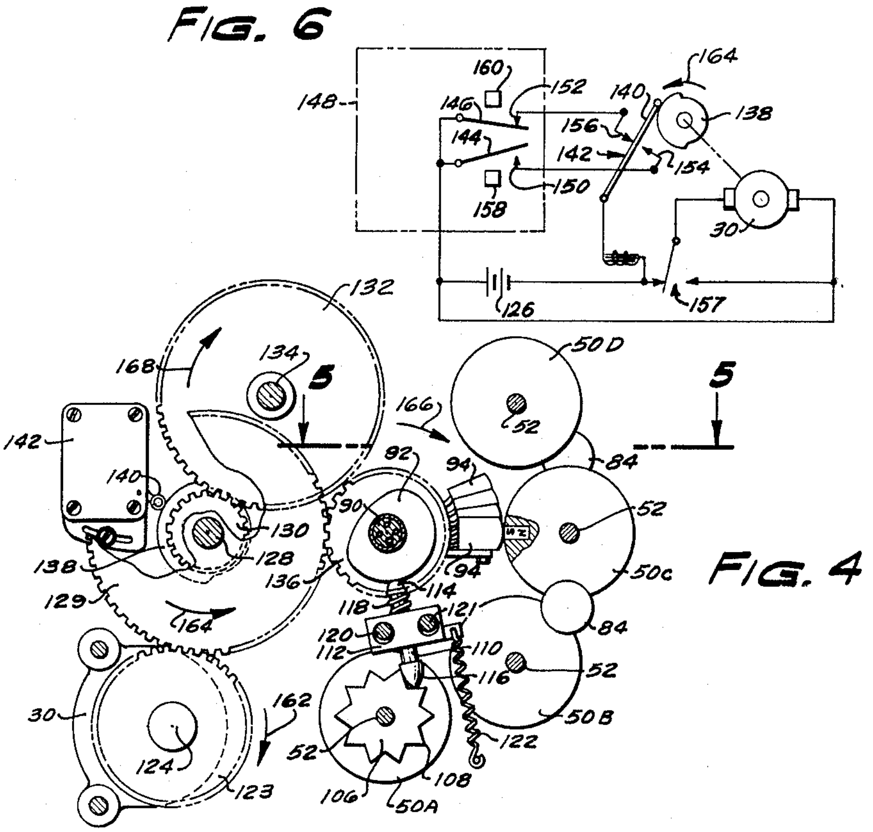
FIG. 4 is a diagrammatic view of the gear train which rotates the magnetic pick-up heads of the recorder of FIG. 1.
FIG. 6 is a schematic diagram of the electrical circuit employed to operate the gear train of FIGURE 4.

The motor 30 and gear train for rotating the pick-up heads 94 is shown in FIGURE 4 to include a first gear 123 attached to the drive shaft 124 of such motor. This is a D.C. operated electric motor which is connected to a battery 126 at a terminal strip 127, as shown in FIGURE 1. The teeth of the first gear 123 mesh with the teeth of a larger second gear 129 which is rigidly secured to a gear shaft 128 for rotation of such shaft. A smaller third gear 130 is also secured to the gear shaft 128 for rotation therewith so that its gear teeth mesh with those of a fourth gear 132 which is rigidly secured to the capstan shaft 134. The capstan 28 is connected at one end of the capstan shaft 134 for moving the magnetic tape 20 past the recording head 22 in the manner previously described. The gear teeth of the second gear 129 also mesh with the gear teeth of a fifth gear 136 which is secured to the cam shaft 90 for rotation of the lock cam 92 and the pick-up heads 94 to obtain an electrical readout in a manner previously described. It should be noted that the tape drive capstan and pick-up heads are mechanically coupled so that any variation in the speed of the motor due to deterioration of the battery does not affect the relative position of the recorded pulses on the magnetic tape. A switch cam 138 is also secured to the gear shaft 128 for rotation therewith and the outer surface of such switch cam engages a cam follower switch contact 140 forming part of an electrical switch 142. The switch cam 138 is a half cam with 10° transition regions so that it holds the cam follower 140 in one position for 170° of rotation of the cam, moves the cam follower to the other switch position during the 10° rotation of the cam from 170° to 180°, and holds such cam follower in such other position for another 170° of rotation of the cam from 180° to 350° before returning it to the original switch position during the 10° transfer rotation of the cam from 350° to 360°. Thus, the microswitch 142 is a two-position switch which opens and closes the electrical circuit from the battery 126 to the motor 30 in a manner shown in FIG. 6.

As shown in FIG. 6, the battery 126 is connected to one terminal of the winding of the D.C. motor 30 and to the movable contacts 144 and 146 of a switch located inside a timing device 148 which controls the operation of such switch. The stationary contacts 150 and 152 of the timing switch are electrically connected to the stationary contacts 154 and 156, respectively, of the microswitch 142. The cam follower switch contact 140 of the microswitch is electrically connected to the other terminal of the winding for the D.C. motor 30 through a relay 157. Thus, when the switch cam 138 rotates it urges the cam follower contact 140 out of engagement with one of the microswitch contacts 154 and 156 and into engagement of the other of such contacts. The timing device 148 may be in the form of an electric clock having two permanent magnets 158 and 160 mounted on arms secured to the minute hand shaft of such clock 180° apart and two movable switch contacts 144 and 146 mounted 90° apart along the circular path of the magnets. Thus, the timing device 148 closes one of the movable switch contacts 144 and 146 alternately every 15 minutes and holds such switch contact closed for a sufficient time to allow the pick-up heads 94 to complete one revolution past the counter cylinders 50. In the switch position shown in FIG. 6 the switch magnet 160 has been rotated into position to move the movable switch contact 146 into engagement with the stationary switch contact 152. This completes an electrical circuit through contacts 156 and 140 of the microswitch to close the relay 157 into the position shown in FIG. 6 which connects the battery 126 to the electrical motor 30 causing such motor to start rotating the gear 122 clockwise in a direction of arrow 162 shown in FIG. 4. As a result of this clockwise rotation of gear 123, the gear 129 rotates counterclockwise in the direction of arrow 164 causing the shaft 128 to rotate in the same direction along with cam 138 and gear 130.

The counterclockwise rotation of gear 129 causes the gear 136 to rotate clockwise in the direction of arrow 166, as well as the shaft 90, the locking cam 92 and the pick-up heads 94 attached to such shaft. The locking cam 92 is arranged so that it depresses the plunger rod 110 into contact with the index member 106 of the locking mechanism to stop rotation of the driver counter cylinder 50A and the other cylinders before the first pick-up head 94 sweeps across the tens counter cylinder 50D. Rotation of the gear 130 also causes the gear 132 to rotate clockwise in the direction of arrow 168 to rotate the capstan 28 in the same direction so that it pulls the tape 20 forward in the direction of arrow 24, as shown in FIGURE 1. After the switch cam 138 revolves 180 degrees, the cam follower switch contact 140 moves away from the stationary switch contact 156 into engagement with switch 154, thereby breaking the electrical circuit and stopping the motor. By this time the pick-up heads 94 have completed their sweep past the counter cylinders 50 and are stopped somewhere between the hundredths counter cylinder 50A and the tens counter cylinder 50D.

The relay 157 may be connected so that its movable contact normally short-circuits the windings of the motor 30 in order to provide dynamic breaking for such motor. This relay is energized by current flowing through its solenoid coil from the battery when the timer switches and cam switch 124 are in position to allow this as in FIGURE 6. The movable contact of the relay 157 connects the motor 30 to the battery 126 to start such motor when such relay is so energized. However, where the relay is deenergized by breaking the circuit between the coil of such relay and the battery, the movable contact of the relay breaks the circuits to the battery to stop the motor. After a predetermined time the timing device 148 rotates the switch magnet 160 through 90 degrees to move the switch contact 144 into engagement with the switch contact 150. This again completes the electrical circuit from the battery 126 to the motor 30 through the microswitch contacts 140 and 154 and relay 157 so that the motor causes gear 123 to rotate the switch cam 138 another 180 degrees for another sweep of the pick-up heads 94. The timing device continues to rotate the switch magnets until magnet 160 no longer closes switch contacts 144 and 150, and after another 90 degrees rotation the magnet 158 is in position to close switch contacts 146 and 152. It should be noted that the gear 129 is provided with twice the number of teeth as that of the gear 136 so that a rotation of 180 degrees by gear 129 causes the gear 136 to rotate 360 degrees for a complete revolution of the pick-up heads. Thus, the setting of the timing device 148 determines the frequency of the electrical readout obtained by the pick-up heads 94.

Therefore, while the counter cylinders 50 operate continuously to monitor the liquid level, except when they are locked by the locking mechanism 106–110, the tape recorder including pick-up heads 94 and recording head 22 is operated only periodically to sample the reading of the counter cylinders at selected time intervals. This allows the magnetic data recorder of the present invention to operate over a longer period of time than would be possible if the tape recording mechanism were recording continuously. In addition to or instead of recording the counter readout signal pulses on magnetic tape inside the recorder, it is also possible to monitor these signal pulses in other ways, such as by transmitting them to distant stations remote from the recorder with telemetry apparatus for remote indication or recording of such pulses. The use of north and south magnetic signals to produce the binary coded electrical signal, rather than the presence and absence of a magnetic signal, allows asynchronous telemetry since the remote receiving devices do not have to be synchronized in time with the pick-up heads 14 or other sending devices when positive and negative electrical signals are produced. This also enables the sending device to prepare the receiving device to accept a data signal by "triggering" such receiving device with a portion of the data signal, and transmitting the remainder of such signal through a delay line before it reaches the receiver. A predetermined number of data signal pulses can be transmitted to the receiver during a known period of time to check the completeness of the message received.

It will be obvious to those having ordinary skill in the art that various changes may be made in the details of the preferred embodiment of the present invention without departing from the spirit of the invention. Therefore, it is not intended to limit the scope of the present invention to the above-described preferred embodiment and this scope should only be determined by the following claims.

I claim:

1. Measuring apparatus comprising:
a shaft mounted for rotational movement;
a plurality of counter cylinders each having a plurality of elements of magnetic material arranged in a numerical code on its outer surface;
means for rotating said cylinders in response to the movement of said shaft to indicate the number of rotations of said shaft by the rotational position of said elements;
a plurality of magnetic responsive devices mounted adjacent the outer surfaces of said cylinders;
means for moving said devices past the indicator elements of the counter cylinders which indicate the number of rotations of the shaft to obtain an electrical readout signal which corresponds to the number represented by said indicator elements; and
means for monitoring said electrical readout signal.

2. A magnetic recorder for recording the level of a liquid, comprising:
a float body adapted to move with the liquid level;
a plurality of counter cylinders each having a plurality of elements of magnetic material arranged in a numerical code on its outer surface;
means for rotating said cylinders in response to the movement of said float body to indicate said liquid level by the rotational position of said elements;
a plurality of magnetic responsive devices mounted adjacent the outer surfaces of said cylinders;
means for rotating said devices past the indicator elements of the counter cylinders which indicate the existing liquid level, to obtain an electrical signal in the form of coded pulses which correspond to the liquid level number represented by said indicator elements; and
means for recording said electrical signal.

3. A magnetic recorder for recording the level of a liquid, comprising:
a float body adapted to move with the liquid level;
a plurality of counter cylinders of substantially the same diameter, each having a plurality of permanent magnets arranged in numerically coded rows on its outer surface, said cylinders being mounted along an arcuate path with their axes parallel;
means for rotating said cylinders in response to the movement of said float body to indicate said liquid level by the rotational position of said magnets;
a plurality of magnetic pickup heads mounted adjacent the outer surfaces of said cylinders;
means for periodically stopping the rotation of said cylinders and for rotating said pickup heads in an arcuate path which is tangent to the outer surfaces of said cylinders past the indicator magnets of the counter cylinders which indicate the existing liquid level, to obtain an electrical readout signal which corresponds to the liquid level number represented by said indicator magnets; and
means for recording said electrical signal on magnetic tape by moving said tape in synchronism with said pickup heads.

4. Measuring apparatus comprising:
a plurality of counter cylinders mounted in spaced relationship with their axes parallel to each other in arcuate path along a circle, with the axis of each of said cylinders positioned substantially the same distance from the center of said circle;
a plurality of elements of magnetic material mounted on the outer cylindrical surface of each of said cylinders and arranged in a plurality of numerically coded rows to provide a different number for each rotational position of said cylinders;
means for connecting one of said cylinders to a source of data to rotate said one cylinder in response to the data received by said apparatus, and for interconnecting said cylinders to enable said one cylinder to drive the other cylinders in sequence so that several revolutions of said one cylinder are required to rotate the next cylinder in the sequence one complete revolution;
a plurality of magnetic responsive devices mounted for rotation about an axis which passes through the center of said circle and is parallel to the axes of said cylinders, said devices being aligned with said elements so that each device is brought into alignment with a different element of one row of elements on each cylinder during rotation of said devices; and
means for rotating said devices past said cylinders in order to generate an electrical signal which corresponds to the data number represented by the code of said one row of elements on each of said cylinders.

5. A magnetic recorder for counting and recording data, comprising:
a plurality of counter cylinders of substantially the same diameter mounted in spaced relationship with their axes parallel to each other in arcuate path along a circle, with the axis of each of said cylinders positioned substantially the same distance from the center of said circle;
a plurality of permanent magnets mounted on the outer cylindrical surface of each of said cylinders and arranged in a plurality of numerically coded rows to provide a different decimal number for each rotational position of said cylinders;
means for connecting one of said cylinders to a source of data to rotate said one cylinder in response to the data received by said recorder, and for interconnecting said cylinders to enable said one cylinder to drive the other cylinders in sequence so that several revolutions of said one cylinder are required to rotate the next cylinder in the sequence one complete revolution;
a plurality of magnetic pickup heads mounted for rotation about an axis which passes through the center of said circle and is parallel to the axes of said cylinders, said pickup heads being aligned with said magnets so that each pickup head is brought into the effective magnetic field of a different magnet of one row of magnets on each cylinder during rotation of said pickup heads; and
means for temporarily stopping the rotation of said cylinders in one of their number positions and for rotating said pickup heads past said cylinders while they are stopped in order to generate an electrical signal which corresponds to the data number represented by the code of said one row of magnets on each of said cylinders and to transmit said electrical signal to a data recorder.

6. A magnetic recorder for counting and recording data, comprising:
a plurality of counter cylinders of substantially the same diameter mounted for rotation on shafts in spaced relationship with their axes parallel to each other in arcuate path along a circle with the axis of each of said cylinders positioned substantially the same distance from the center of said circle;
a plurality of permanent magnets mounted in the outer cylindrical surface of each of said cylinders with either their north pole or south pole exposed and arranged in a plurality of numerically binary coded rows to provide a different decimal number for each of ten rotational positions of said cylinders;
means for connecting one of said cylinders to a source of data to rotate said one cylinder in response to the data received by said recorder;
transfer means for interconnecting said cylinders to enable said one cylinder to drive the other cylinders in sequence so that several revolutions of said one cylinder are required to rotate the next cylinder in the sequence one complete revolution;

a plurality of magnetic pickup heads mounted in a staggered relationship for rotation about an axis which passes through the center of said circle and is parallel to the axes of said cylinders, said pickup heads being aligned with said magnets so that each pick-up head is brought into the effective magnetic field of a different magnetic of one row of magnets on each cylinder at a different time during rotation of said pickup heads;

means for stopping the rotation of said cylinders, including a position index member mounted on the shaft of said one cylinder, a plunger rod adapted to engage said index member to stop said one cylinder in one of ten positions determined by said index member, and a cam for moving said rod into and out of engagement with said index member in response to rotation of said pickup heads; and means for rotating said pickup heads past said cylinders while they are stopped in order to generate an electrical signal in the form of a series of pulses which correspond to the data member represented by the code of said one row of magnets on each of said cylinders and to transmit said electrical signal to a data recorder.

7. A locking mechanism for preventing the rotation of a shaft, comprising:

an index member adapted to be connected to said shaft and having a plurality of radially extending index points circumferentially spaced about the periphery of said index member to enable the index spaces between said index points to correspond to the different rotational positions of said shaft;

a plunger rod having one end in the shape of a tapered point, said plunger rod being normally spring biased out of engagement with said index member;

guide means for guiding the axial movement of said plunger rod into and out of engagement with said points, and for allowing sideways movement of said plunger rod to prevent jamming of the locking mechanism by permitting the tapered point of said plunger rod to slide into said index spaces regarless of where it initially engages said index points; and means for moving said plunger rod into engagement with said index member to lock said shaft in one of its index positions against rotation.

8. A locking mechanism for preventing the rotation of a shaft, comprising:

an index member adapted to be connected to said shaft and having a plurality of radially extending triangular index points circumferentially spaced about the periphery of said index member to enable the index spaces between said index points to correspond to the different rotational positions of said shaft;

a plunger rod having one end in the shape of a cam follower and its other end in the shape of a tapered point of circular cross section, said plunger rod being normally spring biased out of engagement with said index member;

guide means for guiding the axial movement of said plunger rod into and out of engagement with said index points, and for allowing sideways movement of said plunger rod to prevent jamming of the locking mechanism by permitting the tapered point of said plunger rod to slide into said index spaces regardless of where it initially engages said index points; and cam means mounted adjacent said plunger rod with a cam surface in engagement with the cam follower end of said plunger rod for moving said plunger rod into engagement with said index member by movement of said cam surface with respect to said cam follower to lock said shaft in one of its index positions against rotation.

9. A locking mechanism for preventing the rotation of a shaft, comprising:

an index member adapted to be connected to said shaft and having a plurality of radially extending triangular index points circumferentially spaced about the periphery of said index member to enable the index spaces between said index points to correspond to the different rotational positions of said shaft;

a plunger rod having one end in the shape of a cam follower and its other end in the shape of a tapered point of circular cross section, said plunger rod being normally spring biased out of engagement with said index member;

guide means including a loosely mounted guide member which is spring biased into one position, for guiding the axial movement of said plunger rod in a direction displaced from the axis of said shaft into and out of engagement with said index points, and for allowing sideways movement of said plunger rod to prevent jamming of the locking mechanism by permitting the tapered point of said plunger rod to slide into said index spaces regardless of the place where it initially engages said index points; and cam means rotatably mounted adjacent said plunger rod with a cam surface in engagement with the cam follower end of said plunger rod for moving said plunger rod into engagement with said index member by rotation of said cam surface with respect to said cam follower to lock said shaft in one of its index positions against rotation.

No references cited.